(12) United States Patent
Matsuo et al.

(10) Patent No.: US 7,872,085 B2
(45) Date of Patent: *Jan. 18, 2011

(54) BIAXIALLY ORIENTED POLYPROPLYENE FILM

(75) Inventors: Yoshinori Matsuo, Ageo (JP); Tadakazu Ishiwata, Chiba (JP); Fumio Jinno, Tokyo (JP)

(73) Assignee: Oji Paper Co., Ltd. (JP)

( * ) Notice: Subject to any disclaimer, the term of this patent is extended or adjusted under 35 U.S.C. 154(b) by 59 days.

This patent is subject to a terminal disclaimer.

(21) Appl. No.: 11/932,583

(22) Filed: Oct. 31, 2007

(65) Prior Publication Data

US 2008/0102247 A1    May 1, 2008

(30) Foreign Application Priority Data

Nov. 1, 2006  (JP) .......................... P2006-297250
Oct. 19, 2007  (JP) .......................... P2007-272616

(51) Int. Cl.
*C08F 10/00*  (2006.01)
*B32B 27/32*  (2006.01)

(52) U.S. Cl. ..................... 526/348.1; 428/523; 428/910

(58) Field of Classification Search ................. 428/500, 428/910, 523; 526/348.1
See application file for complete search history.

(56) References Cited

U.S. PATENT DOCUMENTS

| 5,724,222 | A  | * | 3/1998 | Hirano et al. | 361/311 |
| 6,537,652 | B1 | * | 3/2003 | Kochem et al. | 428/220 |
| 6,960,635 | B2 | * | 11/2005 | Stevens et al. | 526/161 |
| 2004/0171782 | A1 | | 9/2004 | Lin et al. | |
| 2007/0110974 | A1 | * | 5/2007 | Ishiwata et al. | 428/220 |
| 2007/0249798 | A1 | * | 10/2007 | Stevens et al. | 526/348 |
| 2008/0042323 | A1 | | 2/2008 | Inukai et al. | |

FOREIGN PATENT DOCUMENTS

| JP | 3791038 | 11/1996 |
| JP | 3654540 | 5/1997 |
| JP | H09-270364 | 10/1997 |
| JP | 3508515 | 6/1999 |
| JP | 2002-105224 | 4/2002 |
| JP | 2004-2655 | 1/2004 |
| JP | 2004-161799 A | 6/2004 |
| JP | 2004-175932 | 6/2004 |
| JP | 2005-064067 A | 3/2005 |
| JP | 2005-89683 | 4/2005 |
| JP | 2006-093688 A | 4/2006 |
| WO | 2006-057066 A1 | 6/2006 |

OTHER PUBLICATIONS

Kerrigan, Ralph M. "High Crystalline Segmented Polypropylene Capacitors Offer Increased Energy Density," Mar. 21-24, 2005; CARTS USA 2005.*
Hiroshi Kuriya, *Introduction to high polymer under polarizing microscope*, Published by Agne Gijyutsu Center, pp. 121-137, (2001).
*High Polymer Analysis Handbook*, New edition, edited by Japan Society for Analytical Chemistry, Council for Analytical Research of High Polymer, Kinokuniya Company Ltd., pp. 606-621 (1995).
Jones et al., *Crystalline Forms of Isotactic Polypropylene*, Makromol. Chem., vol. 75, p. 134-158, (1964).
Lotz, B., α and β phases of isotactic polypropylene: a case of growth kinetics 'phase reentrency' in polymer crystallization, Polymer vol. 39, No. 19, pp. 4561-4567, (1998) Great Britain.
Office Communication from Japanese Patent Office mailed Oct. 5, 2010 in counterpart Japanese Patent Application No. 2007-272616 -35 pages.

* cited by examiner

*Primary Examiner*—Kevin R. Kruer
(74) *Attorney, Agent, or Firm*—Knobbe Martens Olson & Bear LLP

(57) ABSTRACT

The present invention relates to a biaxially oriented polypropylene film containing: a polypropylene resin as a main component thereof, having a weight average molecular weight of 100,000 or more and 500,000 or less, the weight average molecular weight being determined by gel permeation chromatography, wherein at least one surface of the biaxially oriented polypropylene film has a protrusion volume of $2.0 \times 10^4$ $\mu m^3$ or more and $3.0 \times 10^4$ $\mu m^3$ or less, the protrusion volume being determined in an area of 560 μm×745 μm using a super-depth surface profile measurement microscope by determining an average plane of the surface based on distances between plural points on the surface and an irradiation source of the super-depth surface profile measurement microscope and measuring a volume of protrusions projecting from the average plane.

3 Claims, No Drawings

BIAXIALLY ORIENTED POLYPROPLYENE FILM

BACKGROUND OF THE INVENTION

1. Field of the Invention

The present invention relates to a biaxially oriented polypropylene film realizing an excellent balance between a high withstand voltage and an element-winding suitability, the film thickness thereof being very thin.

The present invention claims priority on Japanese Patent Application No. 2006-297250 filed on Nov. 1, 2006, and Japanese Patent Application No. 2007-272616 filed on Oct. 19, 2007, the contents of which are incorporated herein by reference.

2. Description of the Related Art

A biaxially oriented polypropylene film is widely used for electrical application due to its superior electronic properties, such as, for example, withstand voltage and dielectric loss properties, to those of other plastic films. Particularly, a biaxially oriented polypropylene film is widely used as a dielectric film for a capacitor and its demand is significantly increasing. In recent years, various electric equipment have been made to be equipped with an inverter, and thereby the need for downsizing and increasing capacitance of the capacitor has been further increased. In order to meet such marketing needs, it is required that a biaxially oriented polypropylene film be further thinned, while making the biaxially oriented polypropylene film improved in terms of the withstand voltage and processing suitability for winding elements.

While demand for a capacitor film is increasing, the need for a capacitor with further high withstand voltage is particularly intense in the market. Patent Document 1 (Japanese Patent Publication No. 3,654,540) discloses that the withstand voltage is improved by decreasing the ash content in a resin. Also, Patent Document 2 (Japanese Patent Publication No. 3,791,038) discloses that the withstand voltage is improved by making a polypropylene resin have high stereoregularity and crystallinity.

However, such a high stereoregularity as disclosed in Patent Document 2 causes deterioration of the drawability and causes the film to be easily torn during drawing, which is unfavorable for manufacturing a oriented thin film.

On the other hand, the surface of such a film for a capacitor is required to be finely roughened in moderation, so as to improve processing suitability for winding elements at the time of producing a capacitor and sliding properties of the film at the time of processing the film, and also so as to improve oil impregnation properties when the film is applied to an oil-impregrated capacitor. Patent Document 3 (Japanese Unexamined Patent Application, First Publication No. S51-63500) discloses a method for finely roughening the surface of a film.

As a method for finely roughening the surface, there is a method in which a sheet with β-form crystal is drawn. Non-Patent Document 1 ("Introduction to high polymer under polarizing microscope" attributed to Hiroshi Kuriya, published by AGNE GIJYUTSU CENTER, page 131, 2001) discloses that polypropylene resins generally have crystal polymorphism such as α-crystal β-crystal, or the like. The β-crystal has a lower density, a lower melting point, and other different physical properties, in comparison to those of the α-crystal. When a molten polypropylene resin is crystallized within a particular temperature range, the β-crystal is generated. When this β-form is drawn at the vicinity of the melting point thereof, a β-spherulite transfers to an α-spherulite with a density different from that of β-crystal. The density-difference between these crystals generates fine unevenness (plural fine recesses and protrusions) on the film surface. When the surface is roughened by this method, impurities such as additives are not required to be added to the resin. Accordingly, this method is advantageous in forming extremely fine unevenness without deteriorating electric characteristics thereof.

When the surface is roughened with the β-crystal, the formation of the β-crystal under control during the processing for a sheet is technically important. As for the formation of the β-crystal, Patent Document 4 (Japanese Laid-Open Patent Application No. 2004-2655), Patent Document 5 (Japanese Laid-Open Patent Application No. 2004-175932), and Patent Document 6 (Japanese Laid-Open Patent Application No. 2005-89683), for example, disclose that a sheet with a high β-crystal proportion can be produced from a polypropylene resin obtained by polymerization using a particular catalyst, the polypropylene resin having a certain range of melt flow rate, molecular weight, and molecular weight distribution.

In addition, as for the preparation of an oriented polypropylene film with a roughened surface, Patent Document 7 (Japanese Patent Publication No. 3,508,515) discloses a technique in which a film with a roughened surface having a particular range of center line average roughness (Ra) is manufactured by using a polypropylene raw resin with a particular stereoregularity to control the content of β-crystal in a cast raw sheet to a particular content or more.

However, as disclosed in Patent Document 8 (Japanese Unexamined Patent Application, First Publication No. H9-270364) and Patent Document 9 (Japanese Laid-Open Patent Application No. 2002-105224), such a surface roughening generally has the disadvantage of inviting a degradation of electric breakdown voltage, although the surface roughening is essential to enhance processing suitability.

On the other hand, a capacitor downsized without changing capacitance is required, and therefore needs for an extremely thin film have been increasing. In order to obtain such an extremely thin film, the enhancement of the drawability of a raw resin is an essential matter. In order to realize such an enhancement, increasing polydispersity index of the raw resin is useful.

However, such a widening of the molecular weight distribution generally causes deterioration of crystallinity of the resin, as a result of which the withstand voltage of a capacitor deteriorates.

Patent Documents 8 and 9 each disclose a method for obtaining a film with an element-winding suitability and withstand voltage. According to the methods disclosed in Patent Documents 8 and 9, the element-winding suitability and the withstand voltage are provided by adjusting the center line average roughness (Ra) to be within a particular range. However, the element-winding suitability and withstand voltage realized by such a technique have not yet met the needs of the market, and also thinning of the film has not yet been sufficient.

Thus, realization of the high withstand voltage (realization of smoothed surface and high crystallinity) (1) is incompatible with realization of the processing suitability for producing a capacitor (realization of roughened surface) (2) and realization of the extremely thinned film (widening of the molecular weight distribution) (3), the above (1) to (3) being required by the market, and a capacitor film achieving them all has not been provided till now.

SUMMARY OF THE INVENTION

The present invention includes the following aspects.
(1) A biaxially oriented polypropylene film containing: a polypropylene resin as a main component thereof, having a weight average molecular weight of 100,000 or more and 500,000 or less, the weight average molecular weight being determined by gel permeation chromatography, wherein at least one surface of the biaxially oriented polypropylene film has a protrusion volume of $2.0 \times 10^4$ µm$^3$ or more and $3.0 \times 10^4$ µm$^3$ or less, the protrusion volume being determined in an area of 560 µm×745 µm using a super-depth surface profile measurement microscope by determining an average plane of the surface based on distances between plural points on the surface and an irradiation source of the super-depth surface profile measurement microscope and measuring a volume of protrusions projecting from the average plane.
(2) A biaxially oriented polypropylene film according to (1), wherein the polypropylene resin has an isotactic proportion of 95% by mass or more and 99% by mass or less, the isotactic proportion being determined based on an amount of an extraction residue obtained by subjecting the polypropylene resin to sequential-extraction.
(3) A biaxially oriented polypropylene film according to (1) or (2), wherein the polypropylene resin has a molecular weight distribution Mw/Mn of 5 or more and 15 or less.
(4) A biaxially oriented polypropylene film according to any one of (1) to (3), having a thickness of 1 to 7 µm.
(5) A biaxially oriented polypropylene film according to any one of (1) to (4), wherein the biaxially oriented polypropylene film is a capacitor film.

DETAILED DESCRIPTION OF THE INVENTION

An object of the present invention is to provide a biaxially oriented polypropylene film with an excellently balanced high withstand voltage and element-winding suitability and an extremely thin film thickness.

A biaxially oriented polypropylene film according to the present invention contains a polypropylene resin as the main component thereof. The polypropylene resin is specifically a crystalline isotactic polypropylene resin, and more specifically a homopolymer of propylene or a copolymer of propylene and either ethylene or α-olefin having 4 to 10 carbon atoms. As the α-olefin having 4 to 10 carbon atoms, generally well known α-olefins such as 1-butene, 1-pentene, 1-hexene, or the like, can be used. Ethylene or α-olefin may be copolymerized with propylene by random copolymerization or block-copolymerization. The content of the copolymerized ethylene or α-olefin in the polypropylene resin is preferably 2% by mole or less, and more preferably 1% by mole or less.

The weight average molecular weight, determined by gel permeation chromatography (GPC), of the polypropylene resin used in the present invention is 100,000 or more and 500,000 or less. More preferably, the weight average molecular weight thereof is 200,000 or more and 400,000 or less. Even more preferably, the weight average molecular weight thereof is 250,000 or more and 400,000 or less. Particularly, the weight average molecular weight thereof is preferably 300,000 or more and 380,000 or less. Also, the molecular weight distribution (Mw)/(Mn) of the polypropylene resin, calculated by dividing the weight average molecular weight (Mw) thereof by the number average molecular weight (Mn) thereof, is preferably 5 or more, and more preferably 7 or more. On the other hand, the molecular weight distribution (Mw)/(Mn) thereof is preferably 15 or less, more preferably 10 or less, and even more preferably 8 or less.

When the weight average molecular weight exceeds 500,000, the flowability of the resin significantly decreases, so it becomes difficult to control the film thickness of the cast raw sheet. As a result, an oriented film with an extremely thin film thickness cannot be produced with precision in the width direction. Thus, the weight average molecular weight over 500,000 is unfavorable from a practical standpoint. In contrast, when the weight average molecular weight is less than 100,000, extrusion formability is excellent, but the drawability significantly decreases in accordance with a decrease of mechanical properties of a formed sheet, and so biaxial drawing cannot be conducted. Thus, a weight average molecular weight below 100,000 has disadvantages in manufacturing.

The GPC used for measuring the molecular weight is not particularly limited, and a commercially available high-temperature type GPC that enables measuring of the molecular weight of polyolefins may be used without exception. In particular, the molecular weight is determined using a differential refractometer (RI) built-in mode high-temperature GPC (HLC-8121 GPC-HT manufactured by TOSOH CORPORATION) having a GPC column linked with three TSK gel GMHhr-H (20) HT manufactured by TOSOH CORPORATION. The temperature of the column is adjusted to 145° C., trichlorobenzene is used as an eluent, and the flow rate is set at 1.0 ml/min. A calibration curve is made using a standard polystyrene manufactured by TOSOH CORPORATION and measured results are converted into polypropylene values.

Moreover, it is preferable that the proportion of an extraction residue (isotactic component) extracted by subjecting the polypropylene resin to sequential extraction is 95% by mass or more, with respect to the total amount of the polypropylene resin before being subjected to sequential extraction.

Sequential extraction is one of the fractionation methods using differences of stereoregularity of components contained in the polypropylene resin. This sequential extraction can achieve more accurate and detailed fractionation than an extraction using n-heptane only, the extraction using n-heptane only being the simplest and easiest method conventionally used, and an extraction residue obtained by the extraction using n-heptane only being generally called a heptane index (HI) or isotactic index (II). The sequential extraction is carried out by conducting extractions sequentially using plural solvents having different boiling points thereof to determine the distribution of the stereoregularity of the polypropylene resin from the weights of the extracts. In particular, the sequential extraction may be carried out in accordance with a method described in "High Polymer Analysis Handbook", New Edition, edited by Japan Society for Analytical Chemistry, Council for Analytical Research of High Polymer, KINOKUNIYA COMPANY LTD., 1995, page 613.

That is, first, the polypropylene resin is sufficiently dissolved in xylene (1) under reflux, and then left to stand still at room temperature for 4 hours. Then, components insoluble in xylene are collected by filtration, and the insoluble components are subjected to the following extractions. Soluble components are dried to remove xylene, and weighed. This mass of the soluble components is equivalent to the mass of a so-called amorphous atactic component.

The insoluble components are subjected to Soxhlet extractions each for 6 hours, sequentially using n-pentane (2), n-hexane (3), and n-heptane (4), as each solvent, with a Soxhlet type fat extraction apparatus. A component with a lower crystallinity (lower stereoregularity) is extracted with a solvent with a lower boiling point. A component insoluble in n-heptane (4) is defined as an "isotactic" component with an extremely high stereoregularity, and the proportion thereof is shown by the mass proportion of the final extract residue with respect to the mass of the polypropylene resin before being subjected to the sequential extraction.

On the other hand, each component soluble in the solvents (2) to (4) is mainly composed of a polymer having an intermediate-stereoregularity, the polymer being referred to as a "stereoblock".

As thus described, the proportion in the stereoregularity distribution determined by performing sequential extraction is different from the proportion determined by performing extraction using a single solvent, such as the proportion of the so-called heptane-insoluble component (HI value) or isotactic-insoluble component (II value).

According to the present invention, the proportion of the final extraction residue obtained by sequential extraction, that is, the proportion of the isotactic component obtained by sequential extraction, is defined as an index of stereoregularity, and is preferably 95% by mass or more, and more preferably 97% by mass or more and 99% by mass or less. When the polypropylene resin has a highly stereoregular component in an isotactic proportion of 95% by mass or more, the crystallinity of the resin is improved, thereby high withstand voltage is expected to be realized. However, when the isotactic proportion is extremely high, there may be a difficulty in manufacturing since the drawability tends to deteriorate, which results in easy occurrence of tearing at the time of drawing, and the solidification (crystallization) tends to proceed rapidly at the time of forming a cast raw sheet, which results in easy occurrence of flaking from the metal drum used for forming the sheet, for example. Accordingly, it is preferable that the isotactic proportion be 99% by mass or less.

According to the present invention, a biaxially oriented polypropylene film that is further suitable for a capacitor can be obtained by using a raw material of which the molecular weight and molecular weight distribution fall within the above-mentioned ranges and also of which the isotactic proportion falls within the above-mentioned ranges. That is, although realization of high withstand voltage by increasing the stereoregularity (crystallinity) tends to deteriorate the drawability of a polypropylene resin or a cast raw sheet obtained therefrom and makes it difficult to produce a biaxially oriented film that is extremely thin, the drawability thereof is realized by combining a broad range of the molecular weight distribution. On the other hand, although realization of high drawability by broadening the molecular weight distribution tends to deteriorate the withstand voltage of a biaxially oriented film prepared using such a polypropylene resin, a biaxially oriented polypropylene film which is extremely thin and of which the withstand voltage and drawability are excellently balanced can be produced by adjusting the stereoregularity and the molecular weight distribution to the above-mentioned ranges.

As a polymerization method for producing such a polypropylene resin having the above-mentioned ranges of the molecular weight, molecular weight distribution, and stereoregularity, generally known polymerization methods may be adopted. As such generally known polymerization methods, a vapor phase polymerization method, a mass polymerization method, a slurry polymerization method, and the like are exemplified. Moreover, the polymerization method may utilize a multistage polymerization reaction conducted in at least two reactors. In the reactor, a hydrogen or comonomer may be used as a molecular weight modifier.

The catalyst used is not particularly limited, and a generally known Ziegler-Natta catalyst is often adopted. Also, a cocatalyst component or a donor may be contained. The molecular weight, molecular weight distribution, and stereoregularity can be controlled by changing the catalyst or polymerization conditions.

The polypropylene resin with the above-mentioned properties prepared by such a polymerization method is heated and melted at a temperature of 170 to 320° C., preferably 200 to 300° C., and then extruded from a T-die. Then, the resultant is cooled and solidified on a metal drum of which the temperature is held at a temperature of 60 to 140° C., preferably 70 to 130° C. The content ratio of β-crystal in the thus obtained cast raw sheet, determined in accordance with an X-ray diffraction intensity ratio method (A. Turner-Jones et al., Makromol. Chem., volume 75, page 134, 1964), is adjusted to approximately 1% to 60% by controlling the temperature of the metal drum, extrusion temperature, extrusion rate, and casting rate, in the case where no β-form nucleating agent is used.

In the polypropylene resin used in the present invention, it is preferable that the content ratio of β-crystal be 2% to 50%, and more preferably 5 to 25%. If the content ratio of β-crystal is 2% or more, plural fine recesses and protrusions are favorably provided on the surface of the biaxially oriented polypropylene film. In contrast, if the content ratio of β-crystal is 50% or less, the surface of the biaxially oriented polypropylene film is not made to be excessively uneven, and a favorable surface roughness of the biaxially oriented polypropylene film can be realized.

By biaxially orienting such a cast raw sheet containing the β-crystal, a biaxially oriented polypropylene film with plural fine recesses and protrusions is produced.

As described above, the surface roughness is controlled at a certain level by controlling the content ratio of β-crystal. However, the surface roughness is not determined by merely the content ratio of the β-crystal, because the surface roughness is changed by the temperature at the time of orientation. Accordingly, the surface of a formed film is evaluated with feedback to manufacturing conditions such as casting conditions (the content ratio of β-crystal) and stretching conditions so that favorable surface roughness is realized.

As an index for directly evaluating the film surface roughness, arithmetic average roughness (Ra) measured with a contact probe type surface roughness gauge is generally used, for example. However, there is the case in which capacitors produced using films provided with the same level of Ra exhibit significant difference in performance. Accordingly, definition of Ra is not always sufficient to realize objective performance.

With respect to the surface roughness, at least one surface of the biaxially oriented polypropylene film according to the present invention has a protrusion volume of $2.0 \times 10^4$ μm$^3$ or more and $3.0 \times 10^4$ μm$^3$ or less, and preferably $2.5 \times 10^4$ μm$^3$ or more and $3.0 \times 10^4$ μm$^3$ or less. The protrusion volume is determined in an area of 560 μm×745 μm using a super-depth surface profile measurement microscope (which may be a laser microscope) by determining an average plane of the surface (with plural fine recesses and protrusions with reference to the average plane) based on data of distances between plural points on the surface and an irradiation source of the super-depth surface profile measurement microscope and measuring the total volume of protrusions projecting from the average plane If the protrusion volume is moderately high, spaces are favorably maintained between neighboring film layers at the time of element-winding for processing the film into a capacitor, as a result of which the film favorably slides, and occurrence of wrinkles at the time of element-winding and slip to one side are favorably prevented. However, if the protrusion volume exceeds $3.0\times10^4$ μm³, the weight thickness is decreased in accordance with the increase of the space ratio between the neighboring film layers, and the electric breakdown voltage is decreased, and such a matter is unfavorable. In contrast, low protrusion volume, that is, smooth film surface, is favorable in terms of realization of withstand voltage. However, if the protrusion volume is less than $2.0\times10^4$ μm³, the film hardly slides, wrinkles easily occur at the time of element-winding, and the productivity decreases, and such a matter is unfavorable.

In general, Ra defined in JIS-B0601, for example, is measured with a contact probe type surface roughness gauge by moving the top of a probe thereof linearly while contacting with a measuring object surface. Accordingly, it is difficult to evaluate the whole surface by Ra determined by such a way, and therefore difficult to sensitively and accurately detect local change or displacement of the measuring object surface.

In contrast, according to the present invention, the displacement in the thickness direction of the film is not evaluated with respect to a line, but evaluated with respect to the whole surface in a determined area, in accordance with a method for evaluation of the surface roughness using a protrusion volume parameter. Accordingly, the spaces between film layers are three-dimensionally evaluated and the local fine change or displacement of the measuring object surface is detected, and thus more accurate data with respect to the surface roughness is obtained. Thus, according to the present invention, both high withstand voltage and favorable element-winding suitability are realized, which could not be achieved by the prior art, by making at least one surface of the film have plural fine recesses and protrusions using not a protrusion height parameter (which is a general evaluation parameter used for determining Ra) but the protrusion volume parameter (which is a three-dimensional parameter) as an index for evaluating the spaces between film layers, so that the protrusion volume parameter falls within a particular range.

In order to measure the surface roughness according to the present invention, a super-depth profile measurement microscope and an image analyzing software are used. As the microscope and image analyzing software, commercially available devices for measuring the degree of unevenness of the film surface (determining positions of plural points on the film surface in the thickness direction of the film), and commercially available image analyzing software that enable binary analysis from the unevenness data may be used. In the following, a method for analysis using a color laser 3D profile microscope (super-depth surface profile measurement) manufactured by KEYENCE CORPORATION under the trade name VK-8500 and an image analyzing software manufactured by Ryoka Systems Inc., under the trade name NSIMAGIK will be explained in detail.

First, the surface of the biaxially oriented polypropylene film is observed using a color laser 3D profile microscope (with an objective lens of twenty magnifications). In a field-of-view of 560 μm×745 μm, an image of the film surface (with plural unevenness) is captured at a resolution of 1023×767 pixels. At that time, data of distances between plural points on the film surface (plural fine recesses and protrusions) and an irradiation source of the color laser 3D profile microscope are included as unevenness data in the image analyzing software. Next, in accordance with JIS-B 0601 (2001), undulation components and noise components are cut off from the unevenness data. As values for cutting the undulation components and noise components off, any values may be adopted, provided that adequate analysis is permitted. In the present specification, the undulation components are cut off at a wavelength cut-off value of 60 μm or more, and the noise components are cut off at a wavelength cut-off value of 10 μm or less. After cutting the undulation components and the noise components off, an average plane of the film surface (an average plane of the plural fine recesses and protrusions) is determined using the obtained data with respect to the unevenness. Then, the total volume of protrusions projecting from the average plane is measured from the average plane to each outermost plane of the protrusions. The measurement is performed three times per film, and the obtained values are averaged as the protrusion volume.

On at least one surface of the film according to the present invention, fine unevenness (fine plural recesses and protrusions) is provided in a manner satisfying the above-mentioned ranges of the protrusion volume. As a method for providing such an unevenness, a method in which a β-form crystal is used, an embossing method, an etching method, or other various surface roughening methods may be adopted. Among them, the method in which a β-form crystal is used for roughening the surface is preferably adopted, since impurities are not formulated. Also, according to such a method, the proportion of yielded β-form crystal is controlled by adjusting the casting temperature, and the proportion of melted β-form crystal is controlled by adjusting the temperature of rolls used in a longitudinal stretching process, and such matters are advantageous in that the above-mentioned surface roughness (unevenness) is easily realized.

In the polypropylene film according to the present invention, other resins may be formulated, as needed, unless the effects of the present invention are prevented. Examples of such other resins include: poly-α-olefins, such as, for example, polyethylene, poly(1-butene), polyisobutene, poly(1-pentene), and poly(1-methylpentene); copolymers of α-olefins, such as, for example, ethylene-propylene copolymers, propylene-butene copolymers, and ethylene-butene copolymers; random copolymers of vinyl monomer-diene monomer, such as, for example, styrene-butadiene random copolymers; and random copolymers of vinyl monomer-diene monomer-vinyl monomer, such as, for example, styrene-butadiene-styrene block-copolymers, however, the other resins are not limited to these.

Although the formulation amount of the other resins depends on the kind thereof, the formulation amount is not particularly limited, unless the effects of the present invention are prevented. In general, the formulation amount is preferably 10 parts by mass or less, more preferably 5 parts by mass or less, with respect to 100 parts by mass of the polypropylene resin.

Also, in the polypropylene film according to the present invention, a stabilizer such as, for example, an antioxidant, an ultraviolet absorber, or a hydrochloric acid absorber, or an additive, such as, for example, a lubricant, a plasticizer, a flame-retardant, or an antistatic agent, may be formulated, as needed, unless the effects of the present invention are prevented.

As a method for manufacturing the biaxially oriented polypropylene film according to the present invention, a sequentially biaxially orienting method is preferably adopted. In accordance with the sequentially biaxially orienting method, for example, a starting pellet containing the above-mentioned polypropylene resin is supplied in an extruder, and then heated and melted at a temperature of 170° C. to 320° C., preferably 200° C. to 300° C. The resultant is extruded from a T-die, and then cooled and solidified on a metal drum held at a temperature of 60° C. to 140° C., preferably 70° C. to 130° C., to obtain a cast raw sheet with β-form crystals. The cooling temperature is suitably determined in accordance with the kind of the used resin. Next, the cast raw sheet is made to pass between rolls rotating at different rates while maintaining the temperature of the cast raw sheet between 100° C. and 160° C., to stretch the cast raw sheet in the flow direction to gain a three- to seven-fold length. Immediately after that, the resultant sheet is cooled at room temperature. Then, the cooled sheet is directed to a tenter, and stretched in the width direction to gain a three- to eleven-fold width while keeping the temperature of the sheet at 150° C. or more. Then, the resultant sheet is relaxed and subjected to thermal fixing, followed by winding up to obtain the biaxially oriented polypropylene film.

In such a stretching process, the mechanical strength and rigidity are excellently provided to the sheet, and plural fine recesses and protrusions on the surface thereof are made to be more distinctly identified, and thus a biaxially oriented film with a finely roughened surface is obtained.

It is preferable that the thickness of the biaxially oriented polypropylene film be 1 μm or more and 7 μm or less, more preferably 1 μm or more and 4 μm or less. Since the above-mentioned resin is extremely excellent in drawability, such an extremely thin oriented film is obtained. Moreover, since the surface of the biaxially oriented film is finely roughened, the film is excellent in element-winding suitability. Also, the biaxially oriented film has a high withstand voltage, and is extremely thin. Accordingly, the biaxially oriented sheet allows easy realization of high capacitance, and therefore is favorably used as a capacitor film.

The capacitor film according to the present invention may be subjected to corona discharge treatment continuously or separately after the stretching and thermal fixing processes are ended, in order that an improved adhesiveness is realized at a metallizing process. Although the corona discharge treatment may be performed in accordance with any generally known methods, it is preferable the atmosphere gas under which the corona discharge treatment is performed be air, a carbonic acid gas, nitrogen gas, or a mixed gas thereof.

EXAMPLES

In the following, the present invention will be explained in more detail by way of examples. However, the present invention is not limited to these. Also, "parts" and "%" used in the examples indicate "parts by mass" and "% by mass", respectively, unless otherwise so indicated.

(Method for Measuring Characteristic Values and Method for Evaluating Effects)

In the examples, measurement of characteristic values and evaluation of effects were conducted as follows.

(1). Measurement of Weight Average Molecular Weight (Mw) and Molecular Weight Distribution (Mw/Mn).

GPC (gel permeation chromatography) was used under the following conditions.

| | |
|---|---|
| Measuring Instrument: | Differential refractometer (RI) built-in high-temperature GPC manufactured by TOSOH CORPORATION under the trade name HLC-8121 GPC-HT type. |
| Column: | Three connected TSK gel GMHhr-H(20) HT manufactured by TOSOH CORPORATION. |
| Column temperature: | 145° C. |
| Eluent: | Trichlorobenzene |
| Flow rate: | 1.0 ml/min |

The calibration curve was formed using a standard polystyrene manufactured by TOSOH CORPORATION and resultants were converted into values of the polypropylene.

(2). Determination of Arithmetic Average Roughness.

The arithmetic average roughness (Ra) was determined in accordance with a method defined in JIS-B0601. The cut off value used was 0.8 mm.

(3). Determination of Protrusion Volume Using a Color Laser 3D Profile Microscope and Image Analyzing Software.

The surface of each film was observed using a color laser 3D profile microscope (with an objective lens of twenty magnifications). In a field-of-view of 560 μm×745 μm, an image of plural fine recesses and protrusions on the film surface was captured at a resolution of 1023×767 pixels. At that time, data of the distances between an irradiation source of the color laser 3D profile microscope and various points of the plural fine recesses and protrusions were included as unevenness data in the image analyzing software. Next, in accordance with JIS-B 0601 (2001), undulation components and noise components were cut off from the unevenness data. The undulation components were cut off at a wavelength cut-off value of 60 μm or more, and the noise components were cut off at a wavelength cut-off value of 10 μm or less. After cutting the undulation components and the noise components off, an average plane of the film surface (the plural fine recesses and protrusions) was determined using the obtained data with respect to the unevenness. Then, the volume of protrusions projecting from the average plane was measured from the average plane to each outermost plane of the protrusions. The measurement was performed three times per film, and the obtained values were averaged as the protrusion volume from the average plane.

Measuring Instrument: Color laser 3D profile microscope manufactured by KEYENCE CORPORATION under the trade name VK-8500.

Image analyzing software: NSIMAGIK manufactured by Ryoka Systems Inc.

(4). Measurement of the Distribution of the Stereoregularity by Conducting Sequential Extraction.

The polypropylene resin was sufficiently dissolved in xylene (1) under reflux, and then left to stand still at room temperature for 4 hours. Components insoluble in xylene were separated by filtration, and subjected to the following extractions. Soluble components were dried to remove xylene, and weighed. This mass was considered as the content of an atactic component. The components insoluble in xylene were subjected to Soxhlet extractions sequentially using n-pentane (2), n-hexane (3), and n-heptane (4) with a Soxhlet type fat extraction apparatus each for 6 hours. An extraction residue finally obtained as a component insoluble in n-heptane was weighed, and the mass thereof was considered as the content of an isotactic component. The proportion of the isotactic component (isotactic proportion) was indicated by percentage by mass with respect to the mass of the polypropylene resin before being dissolved.

(5). Measurement of Film Thickness

The thickness of a biaxially oriented polypropylene film was measured using a micrometer (JIS-B7502) in accordance with JIS-C2330.

(6). Evaluation of Withstand Voltage.

The withstand voltage of a biaxially oriented polypropylene film was evaluated in accordance with JIS-C2151 and JIS-C2330. In this evaluation, the value calculated by dividing the measured voltage level by the thickness of the film was used as a electric breakdown voltage level. In general, it is preferable from a practical standpoint that the electric breakdown voltage level be 0.3 KV/μm or more.

(7). Evaluation of Element-Winding Suitability

The processability at the time of element-winding was evaluated in accordance with the following criteria.
   A. The processability was favorable.
   B. The processability was unfavorable.

(8). Total Evaluation as a Biaxially Oriented Film for a Capacitor

The film was totally evaluated with respect to the suitability for a capacitor film by evaluating the film in terms of the possibility of producing a thin film required for improving capacitance, the possibility of providing fine surface roughness required for winding elements, and the possibility of improving withstand voltage. The evaluation was conducted in accordance with the following criteria.
   A. Suitability was significantly improved in comparison with that of prior art films.
   B. Suitability was scarcely improved in comparison with that of prior art films.
   C. Suitability was deteriorated in comparison with that of prior art films.
   D. Suitability for a capacitor was not recognized.

Example 1

A polypropylene resin pellet of which the weight average molecular weight (Mw) was $3.1 \times 10^5$, the molecular weight distribution (Mw/Mn) was 7.4, and the proportion of isotactic component was 97.7% was supplied in an extruder, melted at a resin temperature of 250° C., extruded from a T-die, and wound around a metal drum of which the surface temperature was maintained at 90° C. so that the extruded resin was solidified. Thus, an unoriented cast raw sheet with a thickness of approximately 200 μm was obtained. Then, this unoriented cast raw sheet was drawn in the flow direction to gain a five-fold length, while maintaining the temperature of the sheet at 140° C. Immediately, the oriented sheet was cooled at room temperature. Then, the resultant was drawn in the width direction at 170° C. using a tenter to gain a ten-fold width. Thus, a biaxially oriented polypropylene thin film with a thickness of 4.0 μm was obtained. As a result of determination of the protrusion volume on the surface, it was revealed that the protrusion volume was $2.5 \times 10^4$ μm$^3$ per unit area of 560 μm×745 μm, and thus the surface was favorably roughened. Accordingly, element-winding suitability was favorable. Moreover, the electric breakdown voltage level was 0.50 kV/μm, and thus it was revealed that high withstand voltage was acquired. The results thereof are indicated in Table 1.

Example 2

An unoriented cast raw sheet with a thickness of approximately 140 μm was obtained in a manner similar to that of Example 1, except that a polypropylene resin pellet of which the weight average molecular weight (Mw) was $3.3 \times 10^5$, the molecular weight distribution (Mw/Mn) was 7.1, and the proportion of isotactic component was 97.3% was used instead of the polypropylene resin of Example 1. Then, a biaxially oriented polypropylene thin film with a thickness of 2.8 μm was obtained in a manner similar to that of Example 1, except that the unoriented cast raw sheet was used instead of the unoriented cast raw sheet of Example 1. As a result of determination of the protrusion volume on the surface, it was revealed that the protrusion volume was $2.6 \times 10^4$ m$^3$ per unit area of 560 μm×745 μm, and thus the surface was favorably roughened. Accordingly, element-winding suitability was favorable Moreover, the electric breakdown voltage level was 0.48 kV/μm, and thus it was revealed that high withstand voltage was acquired. The results thereof are indicated in Table 1.

Example 3

An unoriented cast raw sheet with a thickness of approximately 200 μm was obtained in a manner similar to that of Example 1, except that a polypropylene resin pellet of which the weight average molecular weight (Mw) was $3.1 \times 10^5$, the molecular weight distribution (Mw/Mn) was 7.1, and the proportion of isotactic component was 97.2% was used instead of the polypropylene resin of Example 1. Then, a biaxially oriented polypropylene thin film with a thickness of 4.0 μm was obtained in a manner similar to that of Example 1, except that the unoriented cast raw sheet was used instead of the unoriented cast raw sheet of Example 1. As a result of determination of the protrusion volume on the surface, it was revealed that the protrusion volume was $3.0 \times 10^4$ μm$^3$ per unit area of 560 μm×745 μm, and thus the surface was favorably roughened. Accordingly, element-winding suitability was favorable. Moreover, the electric breakdown voltage level was 0.37 kV/μm, and thus it was revealed that favorable withstand voltage was acquired. The results thereof are indicated in Table 1.

Example 4

A polypropylene resin pellet of which the weight average molecular weight (Mw) was $3.6 \times 10^5$, the molecular weight distribution (Mw/Mn) was 5.0, and the proportion of isotactic component was 95.3% was supplied in an extruder, melted at a resin temperature of 250° C., extruded from a T-die, and wound around a metal drum of which the surface temperature was maintained at 100° C. so that the extruded resin was solidified. Thus, an unoriented cast raw sheet with a thickness of approximately 150 μm was obtained. Then, this unoriented cast raw sheet was drawn in the flow direction to gain a five-fold length, while maintaining the temperature of the sheet at 145° C. Immediately, the oriented sheet was cooled at room temperature. Then, the resultant was drawn in the width direction at 170° C. using a tenter to gain a ten-fold width. Thus, a biaxially oriented polypropylene thin film with a thickness of 3.0 μm was obtained. As a result of determination of the protrusion volume on the surface, it was revealed that the protrusion volume was $2.6 \times 10^4$ μm$^3$ per unit area of 560 μm×745 μm, and thus the surface was favorably roughened. Also, element-winding suitability was favorable. Moreover, the electric breakdown voltage level was 0.45 kV/μm, and thus it was revealed that high withstand voltage was acquired. The results thereof are indicated in Table 1.

Comparative Example 1

An unoriented cast raw sheet was obtained in a manner similar to that of Example 1, except that the surface temperature of the metal drum was adjusted to 50° C. Then, a biaxially oriented polypropylene thin film with a thickness of 4.0 μm was obtained in a manner similar to that of Example 1, except that the unoriented cast raw sheet was used instead of the unoriented cast raw sheet of Example 1. As a result of determination of the protrusion volume on the surface, it was revealed that the protrusion volume was $1.6 \times 10^4$ µm³ per unit area of 560 µm×745 µm. Thus the surface of the sheet was not favorably roughened, and element-winding processing was not favorably performed. However, the electric breakdown voltage level was 0.54 kV/µm, and thus it was revealed that high withstand voltage was acquired. The results thereof are indicated in Table 1.

Comparative Example 2

An unoriented cast raw sheet was obtained in a manner similar to that of Example 1, except that the surface temperature of the metal drum was adjusted to 110° C. Then, a biaxially oriented polypropylene thin film with a thickness of 4.0 µm was obtained in a manner similar to that of Example 1, except that the unoriented cast raw sheet was drawn in the flow direction to gain a five-fold length, while maintaining the temperature of the sheet at 145° C. As a result of determination of the protrusion volume on the surface, it was revealed that the protrusion volume was $3.8 \times 10^4$ µm³ per unit area of 560 µm×745 µm. Thus the surface of the sheet was significantly roughened, and element-winding suitability was favorable. However, the electric breakdown voltage level was 0.26 kV/µm, and thus it was revealed that withstand voltage equal or inferior to that of the prior art was merely acquired. The results thereof are indicated in Table 1.

Comparative Example 3

An unoriented cast raw sheet was obtained in a manner similar to that of Example 4, except that the surface temperature of the metal drum was adjusted to 90° C. Then, a biaxially oriented polypropylene thin film with a thickness of 3.0 µm was obtained in a manner similar to that of Example 4, except that the unoriented cast raw sheet was drawn in the flow direction to gain a five-fold length, while maintaining the temperature of the sheet at 140° C. As a result of determination of the protrusion volume on the surface, it was revealed that the protrusion volume was $1.8 \times 10^4$ µm³ per unit area of 560 µm×745 µm. Thus the surface of the sheet was only scarcely roughened, and element-winding processing was not favorably performed. However, the electric breakdown voltage level was 0.48 kV/µm, and thus it was revealed that high withstand voltage was acquired. The results thereof are indicated in Table 1.

Reference Example 1

An unoriented cast raw sheet with a thickness of approximately 200 µm was obtained in a manner similar to that of Example 1, except that a polypropylene resin pellet of which the weight average molecular weight (Mw) was $3.1 \times 10^5$, the molecular weight distribution (Mw/Mn) was 4.4, and the proportion of isotactic component was 98.0% was used instead of the polypropylene resin of Example 1. Then, the unoriented cast raw sheet was subjected to orientation in the same way as that of Example 1. However, tearing occurred many times in the orientation process, and no biaxially oriented polypropylene thin film with a thickness of 7 µm or less was obtained. The results thereof are indicated in Table 1.

Reference Example 2

An unoriented cast raw sheet with a thickness of approximately 150 µm was obtained in a manner similar to that of Example 1, except that a polypropylene resin pellet of which the weight average molecular weight (Mw) was $3.1 \times 10^5$, the molecular weight distribution (Mw/Mn) was 7.0, and the proportion of isotactic component was 93.4% was used instead of the polypropylene resin of Example 1. Then, a biaxially oriented polypropylene thin film with a thickness of 3.0 µm was obtained in a manner similar to that of Example 1, except that the unoriented cast raw sheet was used instead of the unoriented cast raw sheet of Example 1. As a result of determination of the protrusion volume on the surface, it was revealed that the protrusion volume was $2.1 \times 10^4$ µm³ per unit area of 560 µm×745 µm. Thus the surface of the sheet was moderately roughened, and element-winding suitability was favorable. However, the electric breakdown voltage level was 0.30 kV/µm, and thus it was revealed that withstand voltage equal or inferior to the prior art was merely acquired. The results thereof are indicated in Table 1.

TABLE 1

|  | Weight average molecular weight (Mw) ($\times 10^5$) | Molecular weight distribution (Mw/Mn) | Isotactic proportion (% by mass) | Film thickness (µm) | Arithmetic average roughness Ra (µm) | Protrusion volume in range ($\times 10^4$ µm³) | Electric breakdown voltage (kV/µm) | Element-winding suitability | Total evaluation |
|---|---|---|---|---|---|---|---|---|---|
| Example 1 | 3.1 | 7.4 | 97.7 | 4.0 | 0.14 | 2.5 | 0.50 | A | A |
| Example 2 | 3.3 | 7.1 | 97.3 | 2.8 | 0.11 | 2.6 | 0.48 | A | A |
| Example 3 | 3.1 | 7.1 | 97.2 | 4.0 | 0.13 | 3.0 | 0.37 | A | B |
| Example 4 | 3.6 | 5.0 | 95.3 | 3.0 | 0.13 | 2.6 | 0.45 | A | A |
| Comparative Example 1 | 3.1 | 7.4 | 97.7 | 4.0 | 0.11 | 1.6 | 0.54 | B | C |
| Comparative Example 2 | 3.1 | 7.4 | 97.7 | 4.0 | 0.16 | 3.8 | 0.26 | A | C |
| Comparative Example 3 | 3.6 | 5.0 | 95.3 | 3.0 | 0.10 | 1.8 | 0.48 | B | C |
| Reference Example 1 | 3.1 | 4.4 | 98.0 | Oriented film with a thickness of 7 µm or less could not be formed. | | | | — | D |
| Reference Example 2 | 3.1 | 7.0 | 93.4 | 3.0 | 0.09 | 2.1 | 0.30 | A | C |

In Examples 1 to 4, each biaxially oriented film with a surface roughness falling within the range according to the present invention exhibited excellent withstand voltage, and element-winding suitability. The surface roughness was evaluated using the data of the volume of protrusions projecting from the average plane, measured in a determined area, as an index thereof. As is apparent from the results of Example 2 and Comparative Example 1 where the same data was exhibited in terms of the arithmetic average roughness (Ra), which is conventionally used as an index for evaluating the surface roughness, the protrusion volume falling within the defined range contributed to make the resultant film have excellent withstand voltage and element-winding suitability, without depending on the arithmetic average roughness (Ra).

On the other hand, although favorable withstand voltage was exhibited in Comparative Examples 1 and 3 where small surface roughness was provided, unfavorable element winding suitability was exhibited therein. Although favorable element winding suitability was exhibited in Comparative Example 2 where large surface roughness was provided, unfavorable withstand voltage was exhibited therein.

Moreover, in Reference Example 1 where the molecular weight, molecular weight distribution, and isotactic proportion were unfavorably balanced, a polypropylene oriented film was not produced. In Reference Example 2 wherein the isotactic proportion was small, although favorable surface roughness was provided, favorable withstand voltage was not realized.

As described above, the biaxially oriented polypropylene film according to the present invention exhibits not only high withstand voltage but also excellent element-winding suitability. Moreover, the biaxially oriented polypropylene film is thin suitable to a capacitor.

What is claimed is:

1. A biaxially oriented polypropylene film comprising:
a polypropylene resin as a main component thereof; having a weight average molecular weight of 100,000 or more and 500,000 or less, the weight average molecular weight being determined by gel permeation chromatography,
wherein the polypropylene resin has an isotactic proportion of 95% by mass or more and 99% by mass or less, the isotactic proportion being determined based on an amount of an extraction residue obtained by subjecting the polypropylene resin to sequential-extraction,
an electric breakdown voltage level of the biaxially oriented polypropylene film is 0.3 KV/μm or more, and
the biaxially oriented polypropylene film has a thickness of 1 to 7 μm, and at least one surface of the biaxially oriented polypropylene film has a protrusion volume of $2.0 \times 10^4$ μm$^3$ or more and $3.0 \times 10^4$ μm$^3$ or less, the protrusion using a super-depth surface profile measurement microscope by determining an average plane of the surface and an irradiation source of the super-depth surface profile measurement microscope and measuring a volume of protrusions projecting from the average plane.

2. A biaxially oriented polypropylene film according to claim 1, wherein the polypropylene resin has a molecular weight distribution Mw/Mn of 5 or more and 15 or less.

3. A biaxially oriented polypropylene film according to claim 1, wherein the biaxially oriented polypropylene film is a capacitor film.

* * * * *